United States Patent [19]

Knauer et al.

[11] Patent Number: 5,276,773
[45] Date of Patent: Jan. 4, 1994

[54] DIGITAL NEURAL NETWORK EXECUTED IN INTEGRATED CIRCUIT TECHNOLOGY

[75] Inventors: Karl Knauer, Grafing; Ulrich Ramacher, Munich; Juergen Pandel, Feldkirchen-Westerham; Hans-Joerg Pfleiderer, Zorneding, all of Fed. Rep. of Germany

[73] Assignee: Siemens Aktiengesellschaft, Munich, Fed. Rep. of Germany

[21] Appl. No.: 374,745

[22] Filed: Jul. 3, 1989

[30] Foreign Application Priority Data

Jul. 5, 1988 [DE] Fed. Rep. of Germany ....... 3822757

[51] Int. Cl.$^5$ .............................. G06F 15/18
[52] U.S. Cl. .................................... 395/27
[58] Field of Search ............ 364/513, 807, 200; 307/201; 395/27

[56] References Cited

U.S. PATENT DOCUMENTS

| | | | |
|---|---|---|---|
| 4,660,166 | 4/1987 | Hopfield | 364/807 |
| 4,731,747 | 3/1988 | Denker | 364/807 |
| 4,737,929 | 4/1988 | Denker | 364/807 |
| 5,014,219 | 5/1991 | White | 364/513 |

OTHER PUBLICATIONS

Murray et al., "Asynchronous VLSI Neural Networks Using Pulse-Stream Arithmetic", *IEEE Jour. of Solid-State Circuits*, vol. 23 No. 3, Jun. 1988, pp. 56–65.
Verleisen et al., "An Analog VLSI Implementation of Hopfield's Neural Network", *IEEE Micro* Dec. 1989 pp. 46–55.
Silviotti et al., "A Novel Associative Memory Implemented Using Collective Computation", 1985 *Chapel Hill Conference on VLSI*, 1985, pp. 11–21.
Lippmann "An Introduction To Computing With Neural Nets", IEEE ASSP, Apr. 1987, pp. 4–22.
IEEE Int'l Solid-State Circuits Conference, 1987, "Session XXII VLSI Systems and Architectures", pp. 304, 305, 437.
Graf, et al. "VLSI Implementation Of A Neural Network Memory With Several Hundreds of Neurons", 1986, pp. 182–187.
Hubbard, et al. "Electronic Neural Networks", 1986, pp. 227–234.
Sage, et al. "An Artificial Neural Network Integrated Circuit Based On MNOS/CCD Principles", 1986, pp. 381–385.

*Primary Examiner*—Allen R. MacDonald

[57] ABSTRACT

A digital neural network has a plurality of neurons (NR) completely meshed with one another, each of which comprises an evaluation stage having a plurality of evaluators (B) that is equal in number to the plurality of neurons (NR) and each of which comprises a decision stage having a decision unit (E). An adjustment information (INF$_E$) that effects a defined pre-adjustment of the decision unit (E) can be supplied to every decision unit (E) by a pre-processing means via an information input. A weighting information (INF$_G$) can be supplied to every evaluator (B) by a pre-processing means via an individual information input. An output information (INF$_A$) can be output by every decision unit (E) to a post-processing means via a respective individual information output. The information outputs of the decision units (E) are each connected to an individual processing input of all evaluators (B) allocated to the appertaining decision unit (E). Individual processing outputs of the evaluators (B) are connected to individual processing inputs of the decision unit (E) in the appertaining neuron (N), so that every output information (INF$_A$) can be indirectly fed back onto every neuron (NR).

14 Claims, 6 Drawing Sheets

DIGITAL NEURAL NETWORK EXECUTED IN INTEGRATED CIRCUIT TECHNOLOGY

BACKGROUND OF THE INVENTION

The present invention is directed to digital neural networks executed in integrated circuit technology.

Artificial neural networks (referred to below as ANN) are proposed for the parallel processing of extremely large data sets with the goal of pattern recognition and processing (for example, of speech or images). Known ANN of this species are composed of a plurality of non-linear processor elements (neurons) that are networked with one another via variable "weighting factors".

The following non-linear transfer characteristics have been proposed for modeling the neurons, c.f. R. P. Lippmann, "An Introduction to Computing with Neural Nets", IEEE ASSP Magazine, Apr. 1987, pages 4–22:
- binary decision,
- linear ramp function with saturation characteristic,
- sigmoidal function,
- tangent-hyperbola function.

Further, a plurality of different structures for the networking of the neurons exist (for example "Hopfield net", "Hamming net", "Perceptron", c.f. R. P. Lippmann as well). A direct digital realization of large nets of this type seems impossible with the current technologies for manufacturing integrated circuits because of the plurality of neurons (>1000) that are required. The main problem is thereby that the number of connections and, thus, the number of variable weighting factors quadratically increases with the number of neurons. For example, 1,000,000 weights are required given 1000 neurons in a completely meshed network.

A few realizations of ANN having, for example, 54 or 256 neurons are disclosed in the literature for a programmable or non-programmable network, respectively, c.f. H. P. Graf, P. De Vegvar, "A CMOS Associative Memory Chip based on Neural Networks, Proc. 1987 IEEE Int. Conf. on Solid State Circuits, pages 304, 305, 437; H.P. Graf et al, "VLSI implementation of a neural network memory with several hundreds of neurons", AIP Conference Proceedings 151, "Neural Networks for Computing", pages 182 through 187, Snowbird, Utah, 1986; W. Hubbard et al, "Electronic Neural Networks", AIP Conference Proceedings 151, "Neural Networks for Computing", pages 227 through 234, Snowbird, Utah, 1986. Proposed realizations have also been disclosed in J. P. Sage, K. Thompson, R. S. Withers, "An Artificial Neural Network Integrated Circuit based on MNOS/CCD principles", AIP Conference Proceedings 151, "Neural Networks for Computing", pages 381 through 384, Snowbird, Utah, 1986. These all involve analog realizations of analog ANNs. Compared to digital realizations, they have the advantage of a significantly smaller implementation surface area. What is disadvantageous, however, is the high power consumption caused by the required resistance matrix, this power consumption opposing a realization of larger, programmable networks (with more than a few hundred neurons). The behavior and the properties of the modelings of ANNs hitherto proposed are preeminently investigated by simulation on vector computers, work stations or special processor fields. The fundamental disadvantage of this method is that the (space) parallelism inherent in the neural network is completely or partially lost in the processing of the information and, thus, the calculating time of the simulated network increases to such orders of magnitude, particularly for large neuron composites, that a speedy or quasi-real-time processing of the jobs cited above is impeded or becomes impossible.

A significant shortening of the calculating time and a far greater pattern throughput is obtained, by contrast, with hardware emulators. In contrast to hardware simulators, they contain an artificial neural network having a small size with whose assistance a larger network can be emulated.

In addition to a higher throughput, the advantage of a digital realization of an ANN is comprised in the greater freedom with which the user can select and set network-typical parameters (for example, discriminator functions).

The demands that users currently make of the degree of complexity (>1000) for general neural networks currently exceed the possibilities of present VLSI integration technology.

In addition to these general, relatively large and complex neural networks, special solutions for specific jobs having smaller neural networks have already been proposed. These proposed, smaller networks are usually realized as complete solutions on a chip, being realized in analog technology with the disadvantages connected therewith.

SUMMARY OF THE INVENTION

The object of the present invention is to create digital neural networks executed in integrated circuit technology that are fashioned with a relatively small plurality of neurons that are completely networked with one another, whereby the limitations established in the known, analog solutions are to be accepted. As stated in the object, a circuit technology that exhibits a low surface area requirement and an adequately short cycle time should be employed.

The object underlying the invention is achieved by a digital neural network executed in integrated circuit technology according to the present invention.

BRIEF DESCRIPTION OF THE DRAWINGS

The invention shall be set forth in detail with reference to a number of figures below.

DESCRIPTION OF THE PREFERRED EMBODIMENTS

Figure 1:
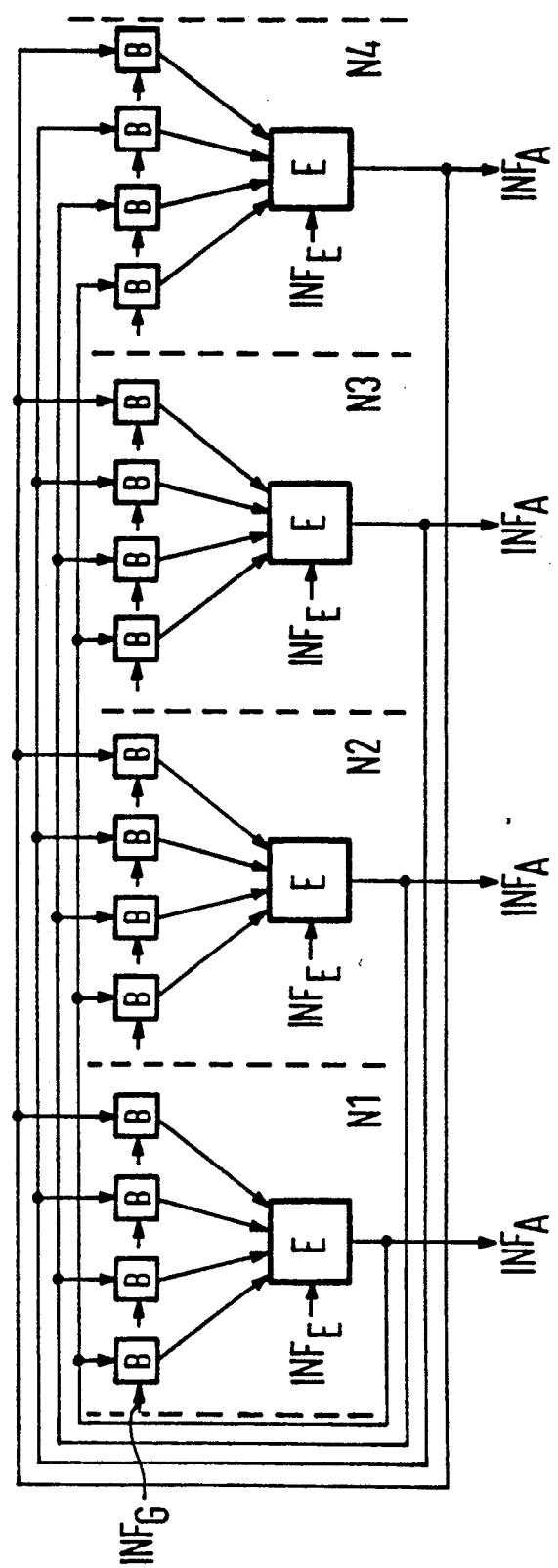
FIG. 1 shows the basic structure of a neural network (Hopfield model) comprising four neurons.

As already set forth, FIG. 1 shows the basic structure of a neural network comprising four neurons N1...N4. All of these neurons are completely meshed with one another. At the neurons N1...N4, individual adjustment possibilities are present at the respectively appertaining evaluation stages B and at a neuron-associated decision stage E, whereby a threshold and an individual, constant input signal can be applied to the decision stages and a weighting information can be applied to the evaluators. In order to eliminate terminal points and, thus, to save chip area, these individual signals are at least partially serially input into the network, whereby these individual signals can be completely stored on the chip that contains the neural network. The following assumptions form the basis for the realization of a digital neural network.

the input/output word width per neuron is defined at 1 bit (binary) (1);

the word width in the evaluation per neuron is defined at 1 bit (binary) (2).

It is provided in detail for the digital neural network that a plurality of neurons completely meshed with one another are provided, each of these comprising an evaluation stage having a plurality of evaluators B that is equal to the plurality of neurons, and comprises a decision stage having the decision unit E; that a pre-processing means can supply every decision unit E with an adjustment information $INF_E$ via an information input, this adjustment information $INF_E$ effecting a defined pre-adjustment of the decision unit E; that a pre-processing means can supply every evaluator B with a weighting information $INF_G$ via an individual information input; that an output information $INF_A$ can be output by every decision unit E, being output to a post-processing means via an individual information output; that the information outputs of the decisions units E are respectively connected to an individual processing input of all evaluators B allocated to the appertaining decision unit E; and that individual processing outputs of the evaluators B are connected to individual processing inputs of the decision unit E in the appertaining neuron, so that every output information $INF_A$ can be fed back to every neuron N in mediated fashioned, cf. FIG. 1.

Figure 2:
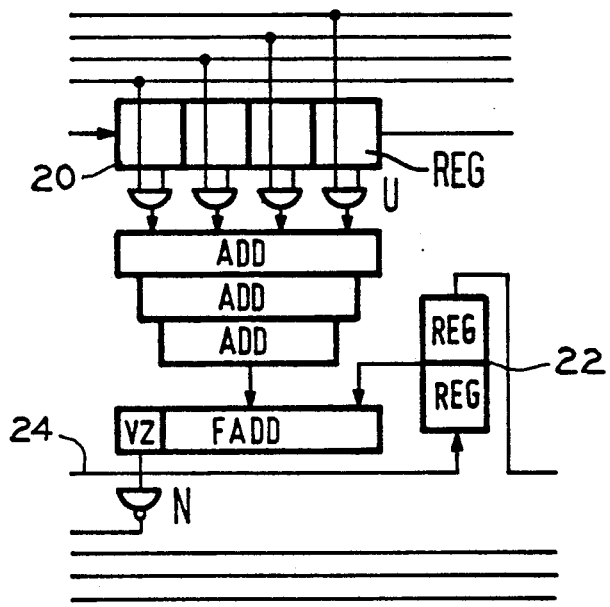
FIG. 2 shows the block circuit diagram of a neural element having binary (0,+1) evaluation.

FIG. 2 shows a structure that can be inventively applied to the assumptions (1) and (2) recited above. This figure shows a neuron that is composed of a neural element having binary (0,+1) evaluation, whereby the element contains a shift register 20 having a plurality of register cells REG corresponding in number to the plurality of neurons in the neural network, said shift register having a serial input for the serial input of evaluation data. Every register cell REG has a logic element U with two signal inputs allocated to it; one signal input is connected to an output of an allocated register cell REG, and the other signal input is connected to the information output of the decision unit of an allocated neuron. The signal output of each logic element is connected to an individual input of an adder tree comprising a plurality of adders ADD arranged in cascade fashion whose outputs are connected to corresponding inputs of a final adder FADD. From a threshold register 22 comprising register cells REG, REG into which serial threshold data can be input from the pre-processing means over line 24, the final adder FADD can be supplied via a further input with the threshold data stored in this fashion. The final adder FADD supplies the operational sign signal VZ as operational sign switch, this operational sign signal VZ, for example, having the signal value "0" for a positive sum and the signal value "1" for a negative sum dependent on the size of the data sum calculated in the final adder FADD. This operational sign switch is followed by a NOT element N. The output of the NOT element N forms the information output of the decision unit that is fed back onto the processing inputs of all evaluators allocated to the appertaining decision unit, namely onto the other signal inputs of the appertaining logic element U. The logic element U is preferably an AND element.

For example, 50 binary evaluations each comprising a single bit are stored in the register 20 having a serial input. The register contents are AND operated with the respective input signal of, for example, the 50 neurons that are provided and are then added up in the adder tree that, for example, is a Wallace adder. Given 50 (equivalent) inputs, the adder including the final adder comprises about 50 full adders. At the beginning of every calculation, the threshold is input into these adders in the form of a negative number. When the sum of the "positive" input signals is greater than this threshold, then the operational sign VZ of the final adder is set, for example, to "0" and, thus, the output of the neuron is switched to "1". The threshold word that is stored in the register 22 is preferably 6 bits wide. Given application of the 1.5 μm technology, such a neuron has a space requirement of about 0.8 mm² or, respectively, given application of the 1.0 μm technology, has a space requirement of about 0.4 mm² and an additional space requirement of about 5 mm² or, respectively, 2.5 mm² is required for the overall wiring of a network comprising 50 neurons. The possible cycle frequency of this arrangement amounts to about 40 MHz or, respectively, 80 MHz.

Figure 4:
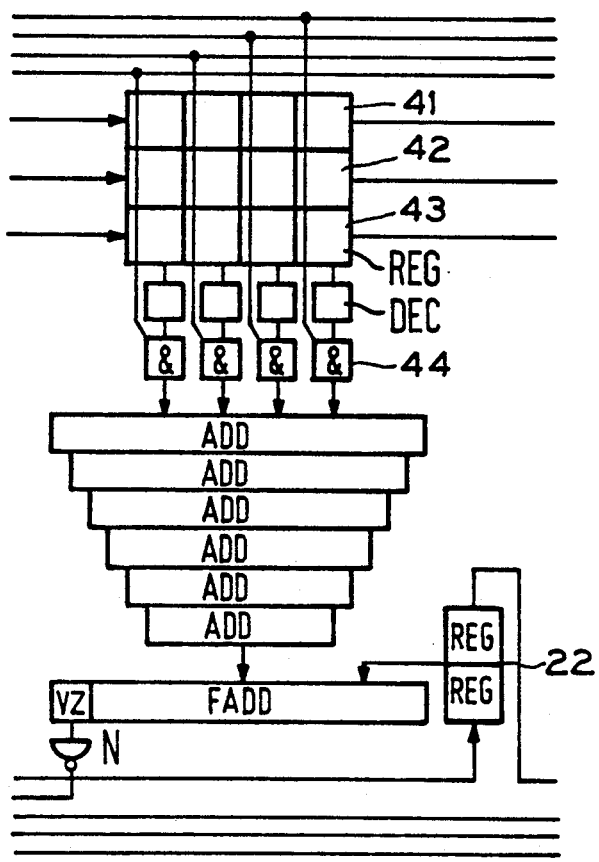
FIG. 4 shows the block circuit diagram of a neural element having expanded evaluation.

FIG. 4 shows the structure of a neural element having expanded evaluation. In detail, FIG. 4 shows that the neuron is composed of a neural element having binary output signals that contain n, preferably n=3, shift registers 41-43 arranged parallel to one another each respectively having a plurality of register cells REG corresponding in number to the plurality of neurons in the neural network, and respectively having a serial input for coded, serial input of evaluation data, so that $2^n$ evaluation degrees, preferably the evaluation degrees 0, 1, 2, 4, 8, 16, 32, 64 can be input to the neural element (an evaluation with positive and negative operational signs, for example −4, −2, −1, 0,+1,+2,+4,+8 is thereby also possible). Every register cell REG has a logic unit 44 with first and second signal inputs allocated to it; the first signal inputs of each logic unit 44 are connected to outputs of a decoder DEC, respectively allocated to the appertaining register cells REG, and the second signal input of each unit is connected to the information output of the decision unit of the allocated neuron and whereby the signal outputs of the logic means are connected to individual inputs of an adder tree comprising a plurality of adders ADD arranged in cascade fashion whose outputs are connected to corresponding inputs of a final adder FADD. From a threshold register 22 comprising register cells REG, REG into which the preprocessing means can input serial threshold data, the final adder FADD can be supplied via a further input with the threshold data stored in this fashion. As an operational sign switch, the final adder FADD supplies the operational signal signal VZ dependent on the size of the data sum calculated in the final adder FADD. The operational sign switch is followed by a NOT element N. The output of the NOT element forms the information output of the decision unit that is fed back onto the processing inputs of all evaluators allocated to the appertaining decision unit, namely, onto the second signal inputs of the appertaining logic elements 44. The logic elements 44 are preferably executed as AND elements.

Figure 3:
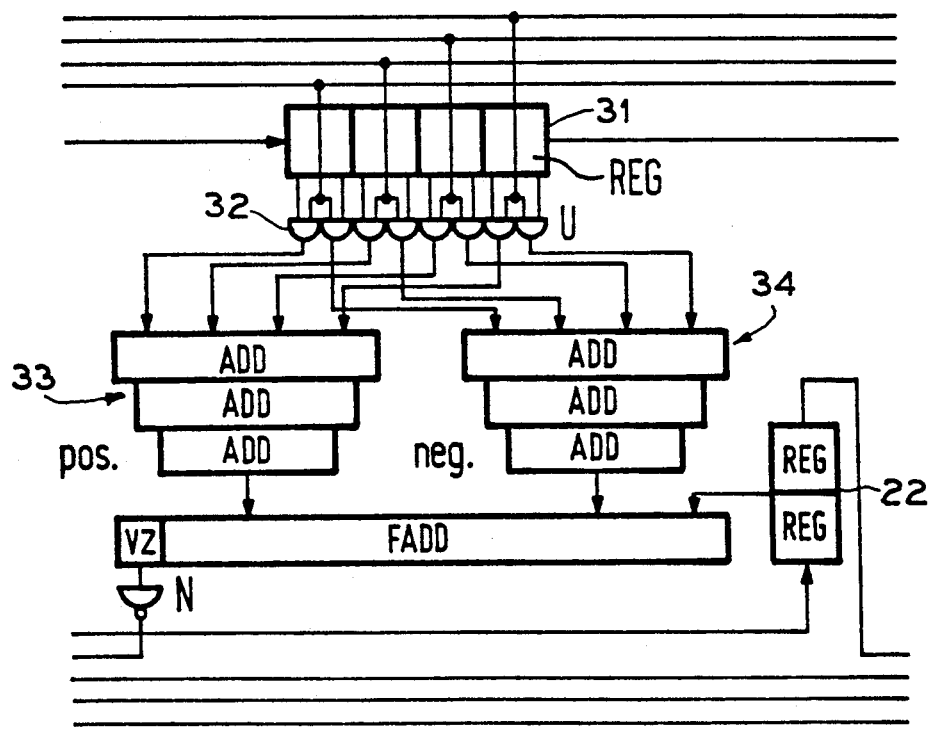
FIG. 3 shows the block circuit diagram of a neural element having ternary (−1, 0,+1) evaluation.

FIG. 3 shows the structure of a neural element having ternary $(-1, 0, +1)$ evaluation that contains a shift register 31 having a plurality of register cells REG corresponding in number to the plurality of neurons in the neural network and having a serial input for the serial input of evaluation data. Every register cell REG has two logic elements 32 with respectively two signal inputs allocated to it; the first signal input of each is respectively connected to an output of the appertaining register 31 cell REG, and the second signal input of each is connected in common to the information output of the decision unit of the allocated neuron. The signal outputs of the logic elements 32 are respectively connected to individual inputs of a first adder tree 33 comprising a plurality of adders ADD arranged in cascade fashion for positively evaluated signals or, respectively, of a second adder tree 34 comprising a plurality of adders ADD arranged in cascade fashion for negatively evaluated signals, whereby the outputs of these adder trees are connected to corresponding inputs of a final adder FADD. From a threshold register 22 comprising register cells REG, REG into which the pre-processing means can input serial threshold data, the final adder FADD can be supplied via a further input with the threshold data stored in such fashion. As the operational sign switch, the final adder FADD supplies the operational sign signal VZ dependent on the size of the data sum calculated in the final adder FADD. The operational sign switch is followed by a NOT element N. The output of the NOT element N forms the information output of the decision unit that is fed back onto the processing inputs of all evaluators allocated to the appertaining decision unit, namely onto the other signal input of the appertaining logic elements U. The logic elements are preferably executed as AND elements.

Figure 5:
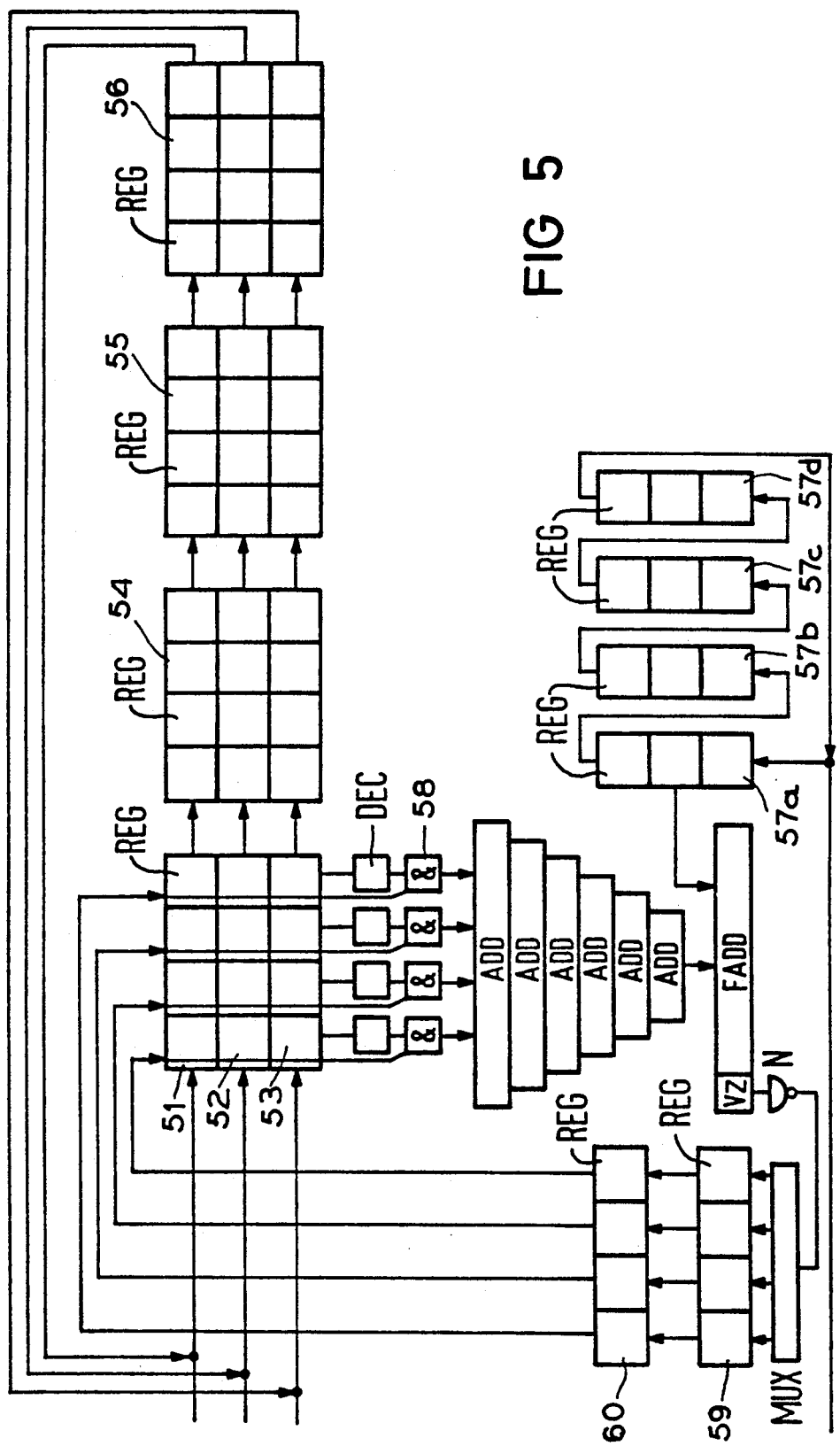
FIG. 5 shows the block circuit diagram of a neural network composed of a single neuron having serial processing.

FIG. 5 shows a neural network that contains a single neuron that is composed of a neural element having binary output signal that contains n, preferably n=3 shift register sections 51-53 arranged parallel to one another, having a plurality of register cells REG corresponding in number to the plurality of neuron functions in the neural network and each having a serial input for the coded, serial input of evaluation data, so that $2^n$ evaluation degrees, preferably the evaluation degrees 0, 1, 2, 4, 8, 16, 32, 64 can be input into the neural element. The shift register sections allocated to the single neuron are multiply provided in accord with the plurality of neuron functions and are arranged in series circuit (with register sections 54-56, for example) forming a loop with one another. Each register cell REG has a logic means 58 comprising first and second signal inputs allocated to it, whereby the first signal inputs are connected to outputs of a decoder DEC allocated to their respectively appertaining register cells REG, whereby the second input is indirectly connected to the information output of the decision unit of the neuron, and whereby the signal outputs of the logic means are connected to individual inputs of an adder tree comprising a plurality of adders ADD arranged in cascade fashion whose outputs are connected to corresponding inputs of a final adder FADD. From a threshold register comprising register cells REG into which serial threshold data can be input by the preprocessing means, the final adder FADD can be supplied via a further input with the threshold data stored in such fashion, whereby the register cells REG of the threshold register are subdivided into a plurality of sections, 57a–57d, this plurality corresponding the plurality of the neuron functions. As operational signal switch, the final adder FADD supplies the operational sign signal VZ dependent on the size of the data sum calculated in the final adder FADD.

This operational sign switch is followed by a NOT element N. The output of the NOT element N forms the information output of the decision unit that is indirectly fed back onto the processing inputs of all evaluators allocated to the appertaining decision unit, namely onto the second signal inputs of the appertaining logic elements 58, whereby a preferably two-stage register arrangement that, per register arrangement stage, comprises a plurality of register cells REG 59 and 60 corresponding in number to the plurality of neuron functions and that can be driven via a multiplexer MUX is inserted between the output of the NOT element N and the second signal inputs.

Figure 6:
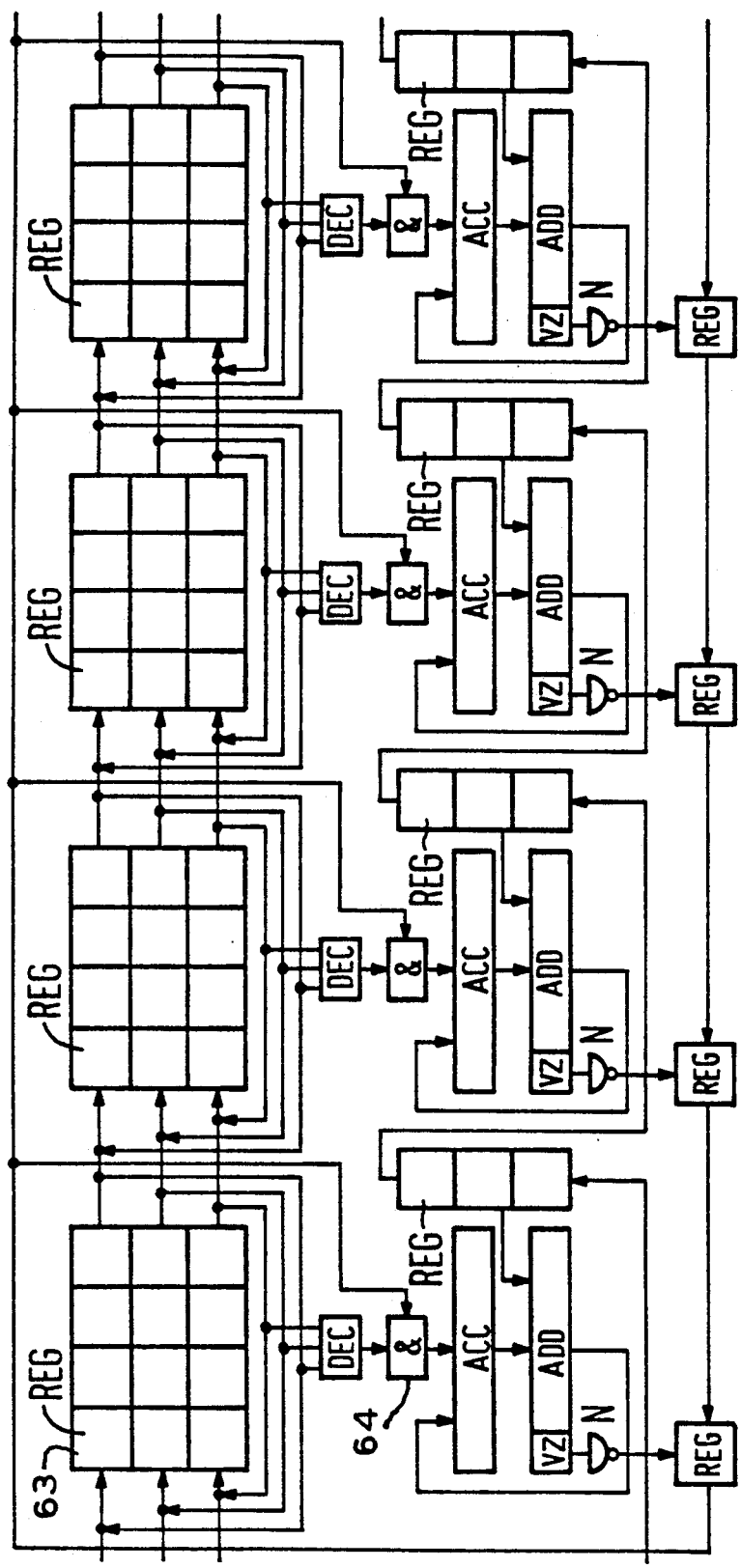
FIG. 6 shows the block circuit diagram of a neural network having serial accumulation in the neurons of this network.

FIG. 6 shows a neural network having serial accumulation in the neurons. It is provided in this structure that the neuron is respectively composed of a neural element having a binary output signal that contains n, preferably n=3 shift register sections arranged parallel to one another that each have a plurality of register cells REG 63 corresponding in number to the plurality of neuron functions in the neural network and that each have a respective serial input for the coded, serial input of evaluation data, so that $2^n$ evaluation degrees, preferably the evaluation degrees 0, 1, 2, 4, 8, 16, 32, 64 can be input in the neural element. The outputs of the shift register sections allocated to the neural are each fed back onto the inputs thereof. A logic means 64 comprising first and second signal inputs is allocated to all of the register cells REG allocated to the neural element; the first signal inputs are connected to outputs of a decoder DEC allocated to the register cells REG, and the second signal input is indirectly connected to the information output of the decision unit of the neuron, and the signal outputs of the logic means 64 are connected to individual inputs of an accumulator ACC whose outputs are connected to corresponding inputs of an adder ADD. From a threshold register comprising register cells REG into which serial threshold data can be input by the pre-processing means, the adder ADD can be supplied via a further input with the threshold data stored in such fashion, whereby the register cells REG of the threshold register are subdivided into a plurality of sections corresponding in number to the plurality of neural elements. As operational sign switch, the adder ADD supplies the operational sign signal VZ dependent on the size of the data sum calculated in the adder ADD. This operational sign switch is followed by a NOT element N. The output of the NOT element N forms the information output of the decision unit that is indirectly fed back onto the processing inputs of all evaluators allocated to the appertaining decision unit, namely onto the second signal inputs of the appertaining logic elements 1, 64, whereby an output register having a plurality of register cells REG corresponding in number to the plurality of neural elements is inserted between the output of the NOT element N and the second signal inputs. Whenever a new signal value is applied for the output memory to the second signal input of the logic elements, the information is cyclically shifted by one place in the register cells REG respectively allocated to the neural elements and this new value is decoded, so that every signal value can be evaluated with a different information.

Figure 7:
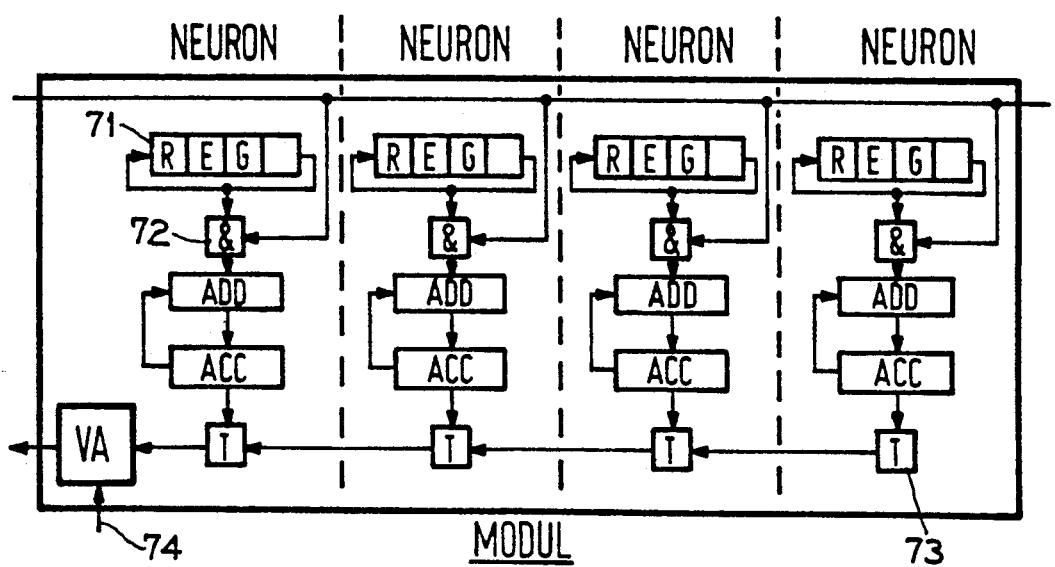
FIG. 7 shows a fundamental circuit diagram of a discrete module comprising four neurons.

FIG. 7 shows a fundamental view of a discrete module comprising four neurons. Every neuron NR contains a shift register 71 having a plurality of register cells corresponding in number to the plurality of neurons NR, namely four, whereby the output of the fourth register cell is connected to the input of the first register cell. An AND logic means 72 is also provided, the first signal input thereof being connected to the output of the fourth register cell, the second signal input thereof being indirectly connected to the output of a full adder VA and the signal output thereof being connected to an adder ADD whose sum output is connected to the input of an accumulator ACC. The output of the accumulator ACC is connected to a second input of the adder ADD. A parallel output of the accumulator ACC is connected to the setting inputs of a plurality of register cells T of a shift register 73, whereby this plurality of register cells T corresponds to the bit width of the accumulator ACC, said shift register containing a plurality of register units T corresponding to the plurality of neurons N, namely four, whereby the output of this shift register is connected to the input of the full adder VA. A second input 74 of the full adder VA is charged with a defined potential, preferably grounded potential equal to logical zero, insofar as only a single module is provided for a neural network.

Figure 8A:
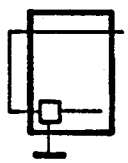
FIGS. 8a, b, c show different principles of the arrangement and of the interconnection of discrete modules for the formation of neural networks of different sizes.

FIG. 8a shows a schematic illustration of a neural network comprising four neurons that is composed of a single module according to FIG. 7.

Figure 8B:
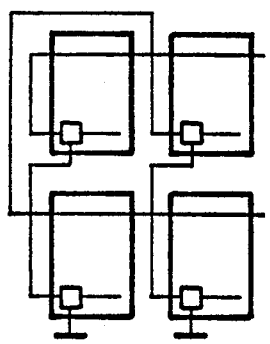

FIG. 8b shows a neural network that is formed of four modules according to FIG. 7, whereby the modules are arranged in quadratic form and whereby the second inputs of the full adders VA of the two lower modules lie at a defined potential, preferably grounded potential equal to logical zero, and whereby the second inputs of the full adders VA of the two upper modules are each connected to the sum output of the full adder of the module arranged respectively therebelow.

Figure 8C:
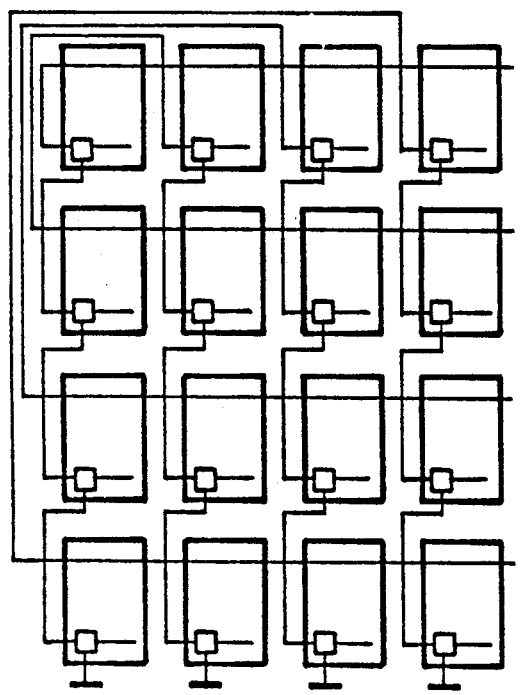

FIG. 8c, finally, shows a schematic illustration of a neural network comprising 16 neurons that contains 16 modules arranged in quadratic form in accord with the principles shown in FIG. 8b.

The circuits of the neurons as well as the auxiliary circuits thereof are preferably executed in 1.5 μm CMOS technology. Another preferred version provides that the circuits of the neurons and the auxiliary circuits thereof are executed in 1.0 μm CMOS technology.

The circuits of the neurons and the auxiliary circuits thereof can be fashioned in a single chip, whereby a plurality of these chips are arranged on a motherboard with corresponding wiring or interconnect management for connecting the chips to one another in other to form large neural networks. It is also contemplated that all required circuits are fashioned on a single wafer.

It will be understood that variations and modifications may be effected without departing from the spirit and scope of the novel concepts of the present invention.

What is claimed is:

1. A digital neural network, comprising:
    a plurality of neurons fully interconnected with one another, each of said neurons comprising an evaluation stage having a plurality of evaluators that is equal in number to the number of neurons and a decision stage having a decision unit, said evaluators each having an information signal input;
    an adjustment information signal that effects a defined threshold of each of said decision units connected to every decision unit via an information input;
    a weighting information signal connected to every evaluator via an individual information input;
    an output line for every decision unit, for supplying an individual information output signal;
    means connecting said information output signals of the decision units to said information signal inputs of a plurality of said evaluators;
    individual processing outputs of the evaluators being directly connected to individual processing inputs of the decision unit in the appertaining neuron,
    so that every information output can be indirectly fed back to every neuron;
    each said neuron is composed of a neural element having binary evaluation stages and contains a shift register having a plurality of register cells corresponding in number to the number of neurons in the neural network and having a serial input for the serial input of the evaluation data;
    every register cell has a logic element with a signal output and two signal inputs allocated to it, the one signal input thereof being connected to an output of the appertaining register cell, the other signal input thereof being connected to the information output signal of the decision unit of one of said neurons, and the signal output thereof being connected to an individual input of an adder tree comprising a plurality of adders whose outputs are connected to inputs of a final adder;
    a threshold register comprising register cells into which serial threshold data can be input from an external source, the final adder connected to receive the threshold data stored in said threshold register via a further input;
    as an operational sign switch, the final adder supplies an operational sign signal dependent on the size of the data sum calculated in the final adder;
    said operational sign switch is followed by a NOT element; and
    said NOT element forms the information output signal of the decision unit that is fed back to all the evaluators allocated to the appertaining decision unit, via the other signal input of the appertaining logic element.

2. A digital neural network according to claim 1, characterized in that
    each said neuron is composed of a neural element having binary output signals that contains n shift registers arranged parallel to one another, each having a plurality of register cells corresponding in number to the number of neurons in the neural network and each having a serial input for the coded, serial input of evaluation data representing $2^n$ evaluation degrees;
    every register cell has a decoder allocated to it and a logic means having a signal output and first and second signal inputs allocated to it, whereby the first signal inputs of said logic means are connected to outputs of said decoder, the second signal input of each said logic means is connected to the information signal output of the decision unit of one of said neurons, and said signal outputs of said logic means are connected to individual inputs of an adder tree comprising a plurality of adders whose outputs are connected to inputs of a final adder;

a threshold register comprising register cells for storing serial threshold data from the pre-processing means, the final adder connected via a further input with said threshold register;

as a operational sign switch, the final adder supplies an operational sign signal dependent on the size of the data cell calculated in the final adder;

the operation sign switch is followed by a NOT element; and said NOT element forms the information output signal of the decision unit that is fed back to the processing units of all evaluators allocated to the appertained decision unit, via the second signal inputs of the appertaining logic elements.

3. The digital neural network according to claim 2, characterized in that the logic elements are AND elements.

4. The digital neural network according to claim 2, characterized in that a single neuron is provided that is composed of a neural element having binary output signals that contains n shift register sections arranged parallel to one another, each having a plurality of register cells corresponding in number to the number of neuron functions in the neural network and each having a serial input for the coded, serial input of evaluation data, representing $2^n$ evaluation degrees, for input to the neural element;

the shift register sections allocated to the single neuron are multiply provided corresponding to the plurality of neuron functions and are arranged in series circuit with one another and forming a loop;

every register cell has a decider allocated to it and has logic means with a signal output and first and second signal inputs allocated to it, the first signal inputs are connected to outputs of said decoder, the second signal input is connected to the information output signal of the decision unit of one of said neurons, and the said signal outputs of the logic means are connected to individual inputs of an adder tree comprising a plurality of adders whose outputs are connected to inputs of a final adder;

a threshold register comprising register cells for storing serial threshold data from the pre-processing means, the final adder connected via a further input with the threshold register, the register cells of the threshold register are subdivided into a plurality of sections corresponding to a plurality of neuron functions;

as an operational sign switch, the final adder supplies an operational sign signal dependent on the size of the data sum calculated in the final adder;

the operational sign switch is followed by a NOT element; and said NOT element forms the information output signal of the decision unit that is fed back to the processing units of a plurality of said evaluators via the second signal inputs of the appertaining logic elements, whereby a two-stage arrangement having a plurality of register cells per register arrangement stage corresponding in number to the number of neuron functions and drivable via a multiplexer is inserted between the output of the NOT element and said signal inputs.

5. The digital neural network according to claim 2, characterized in that the neuron is composed of a neural element having a binary output signal that contains n shift register sections arranged parallel to one another, each having a plurality of register cells corresponding in number to the number of neural elements in the neural network and each having a serial input for the coded, serial input of evaluation data, representing $2^n$ evaluation degrees, as inputs to said neural element;

the outputs of the shift register sections allocated to the neuron are respectively fed back to the inputs thereof;

all the register cells allocated to the neural element have a decoder and logic means comprising a signal output and first and second signal inputs allocated to them, the first signal inputs are connected to outputs of said decoder, the second signal input is connected via a register to the information output signal of the decision unit of one of said neurons, and said signal outputs of the logic means are connected to individual inputs of an accumulator whose outputs are connected to inputs of an adder;

a threshold register comprising register cells for storing serial threshold data from the pre-processing means, the adder connected via a further input with the threshold data stored in said threshold register, whereby the register cells of the threshold register are subdivided into a plurality of sections corresponding in number to the number of neural elements;

as an operational sign switch for switching an operational sign signal, the adder supplies a signal dependent on the size of the data sum calculated in the adder;

the operational sign switch is followed by a NOT element;

said NOT element forms an information output signal of the decision unit that is indirectly fed back to the processing inputs of all evaluators allocated to the appertaining decision unit, via the second signal inputs of the appertaining logic elements, an output register comprising a plurality of register cells corresponding in number to the number of neural elements inserted between the output of said NOT element and the second signal inputs; and whenever a new signal value from the output register is applied to the second signal input of the logic elements, the information in the respective register cells allocated to the neural elements is cyclically shifted via said shift register by one place and this new signal value is decoded, so that every signal value can be evaluated with a different information.

6. The digital neural network according to claim 1, characterized in that said logic element (U) is an AND element.

7. The digital neural network according to claim 1, characterized in that said neurons are executed in 1.5 $\mu$m CMOS technology.

8. The digital neural network according to claim 1, characterized in that said neurons are executed in 1.0 $\mu$m CMOS technology.

9. A digital neuron module comprising four neurons, for the formation of digital neural networks of different sizes, characterized in that every neuron contains a first shift register having a plurality of register cells, namely four, corresponding in number to the number of neurons, an output of the fourth register cell is connected to an input of the first register cell;

an AND logic means having its first signal input connected to an output of the fourth register cell, its second signal input is connected to the output of a full adder, and a signal output of said logic means is connected to an adder whose sum output is connected to the input of an accumulator having a predetermined bit width;

an output of the accumulator is connected to a second input of the adder; and a parallel output of the accumulator is connected to inputs of a plurality of register cells of a second shift register, the number of register cells corresponds to the bit width of the accumulator, said shift register containing a plurality of register units, corresponding in number to the number of neurons, whereby the output of said second shift register is connected to one input of the full adder and a second input of the full adder is supplied with a defined potential.

10. The digital neural network according to claim 9, characterized in that four modules are provided for the formation of a network, said modules being arranged in rows and columns with the first shift registers of neurons in the same row being connected in series, and with the full adders of neurons in the same column being connected with a sum output of one full adder connected to the input of another full adder, and the second inputs of the full adder of two modules are connected to a predetermined potential, and the second inputs of the full adders of the other two modules are each connected to the sum output of the full adder of a module in the same column.

11. The digital neural network according to claim 9, characterized in that a single module is provided for the formation of a network having four neurons.

12. The digital neural network according to claim 9, characterized in that 16 modules are arranged in interconnected rows and columns for the formation of a digital neural network having 16 neurons.

13. A digital neural network, comprising:

a plurality of neurons fully interconnected with one another, each of said neurons comprising an evaluation stage having a plurality of evaluators that is equal in number to the number of neurons and a decision stage having a decision unit, said evaluators each having an information signal input;

an adjustment information signal that effects a defined threshold of each of said decision units connected to every decision unit via an information input;

a weighting information signal connected to every evaluator via an individual information input;

an output line for every decision unit, for supplying an individual information output signal;

means connecting said information output signals of the decision units to said information signal inputs of a plurality of said evaluators;

individual processing outputs of the evaluators being directly connected to individual processing inputs of the decision unit in the appertaining neuron, so that every information output can be indirectly fed back to every neuron;

each said neuron is composed of a neural element having ternary evaluation stages and contains a shift register having a plurality of register cells corresponding in number to the number of neurons in the neural network and having a serial input for the serial input of evaluation data;

every register cell has two logic elements, each having a signal output and two signal inputs allocated to it, the first signal inputs thereof being respectively connected to an output of the appertaining register cell, the second signal inputs thereof being connected in common to the information output signal of the decision unit of one of said neurons, and the signal outputs thereof being respectively connected to individual inputs of a first adder tree having a plurality of adders for positively evaluated signals or, respectively, a second adder tree comprising a plurality of adders for negatively evaluated signals, thereby the outputs of said first and second adder trees are connected to inputs of a final adder;

a threshold register comprising register cells for storing serial threshold data from an external source, the final adder connected via a further input with said threshold register;

as an operational sign switch, the final adder supplies an operational sign signal dependent on the size of the data sum calculated in the final adder;

said operational sign switch is followed by a NOT element; and said NOT element forms the information output signal of the decision unit that is fed back to a plurality of said evaluators, via the other signal inputs of the said logic elements.

14. The digital neural network according to claim 13, characterized in that said logic elements are AND elements.

* * * * *